(12) United States Patent
Ishizu et al.

(10) Patent No.: US 9,049,648 B2
(45) Date of Patent: Jun. 2, 2015

(54) COGNITIVE COMMUNICATION NETWORK SYSTEM AND COMMUNICATING METHOD THEREOF

(75) Inventors: Kentaro Ishizu, Koganei (JP); Homare Murakami, Koganei (JP); Goh Miyamoto, Koganei (JP); Ha Nguyen Tran, Koganei (JP); Stanislav Filin, Koganei (JP); Chen Sun, Koganei (JP); Yohannes Alemseged Demessie, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 438 days.

(21) Appl. No.: 12/889,798

(22) Filed: Sep. 24, 2010

(65) Prior Publication Data

US 2011/0069638 A1     Mar. 24, 2011

(30) Foreign Application Priority Data

Sep. 24, 2009   (JP) ................................ 2009-219103

(51) Int. Cl.
| | |
|---|---|
| *H04W 4/00* | (2009.01) |
| *H04W 48/18* | (2009.01) |
| *H04L 5/00* | (2006.01) |
| *H04B 7/005* | (2006.01) |
| *H04W 24/00* | (2009.01) |
| *H04W 48/10* | (2009.01) |

(52) U.S. Cl.
CPC ............. *H04W 48/18* (2013.01); *H04B 7/005* (2013.01); *H04L 5/0032* (2013.01); *H04L 5/0035* (2013.01); *H04L 5/0064* (2013.01); *H04L 5/0092* (2013.01); *H04W 24/00* (2013.01); *H04W 48/10* (2013.01)

(58) Field of Classification Search
None
See application file for complete search history.

(56) References Cited

FOREIGN PATENT DOCUMENTS

| JP | 2003-152732 A | 5/2003 |
|---|---|---|
| JP | 2007-300419 A | 11/2007 |
| JP | 2009-177403 A | 8/2009 |

OTHER PUBLICATIONS

Hiroshi Harada et al., A Software Defined Cognitive Radio System, 2007, IEEE, pp. 1-6.*

(Continued)

*Primary Examiner* — Nicholas Sloms
(74) *Attorney, Agent, or Firm* — Abelman, Frayne & Schwab

(57) ABSTRACT

Object: To provide a mechanism and a function of a system that can determine a communication method and the like effectively utilizing frequency resources, considering priority of each communication, in a cognitive communication network system of a frequency shared type or the like assuming that a given frequency band is shared by a plurality of systems in use.
Solution: In a configuration in which a cognitive communication network system has a plurality of radio access networks 23 and a superior communication network 10 that provides a common platform at least to the radio access networks, in a plurality of base stations 23a on at least a part of the radio access network 23, base-station state obtaining means 232 that collect information relating to a state of the base station itself in the base station or a communication state and base-station communication reconfiguration managing means 231 that reconfigure at least one of either a selection of the base station to be used in the communication or a communication condition in the base station on the basis of the information collected by the base-station state obtaining means are provided.

16 Claims, 10 Drawing Sheets

(56) References Cited

OTHER PUBLICATIONS

Hiroshi Harada et al., Software Defined Radio Prototype toward Cognitive Radio Communication Systems, 2005, IEEE, pp. 539-547.*

G. Wu, P. Havinga and M. Mizuno, "Mirai Architecture for Heterogeneous Networks," IEEE Comm. Mag., pp. 126-134, 2002.

M. Inoue, K. Mahmud, H. Murakami, M. Hasegawa and H. Morikawa, "Novel Out-of-BandSignaling for Seamless Interworking between Heterogeneous Networks," IEEE Wireless Commun., vol. 11, No. 2, pp. 56-63, 2004.

H. Harada, "Software defined radio prototypetoward Cognitive Radio Communication Systems," IEEE Dyspan 2005, vol. 1, pp. 539-547, 2005.

Masahiro Kuroda, Yoshitoshi Murata, Hiroshi Harada, Shuzo Kato, "Cognitive Wireless Cloud (1) ~ Architecture," Technical Report of IEICE, Technical Committee on Software Radio, pp. 25-28, Mar. 2007.

IEEE P802.21 D8.0, http://www.ieee802.org/21/, IEEE Standard Draft, pp. 12-17 and pp. i-323, 2007.

"IEEE Standard for Architectural Building Blocks Enabling Network-Device Distributed Decision Making for Optimized Radio Resource Usage in Heterogeneous Wireless Access Networks," IEEE 1900.4-2009, pp. i-119, Feb. 2009.

Goh Miyamoto, Kentaro Ishizu, Mikio Hasegawa, Yoshitoshi Murata, "Cognitive Wireless Cloud (2) ~ Data Collection Method for Radio Resource Discovery in Cognitive Wireless Cloud ~," Technical Report of IEICE, Technical Committee on Software Radio, pp. 29-34, Mar. 2007.

Yoshia Saito, Mikio Hasegawa, Yoshitoshi Murata, "Cognitive Wireless Cloud (3) ~ Fast End-to-end QoS Measurement Method in Cognitive Wireless Cloud~," Technical Report of IEICE, Technical Committee on Software Radio, pp. 35-42, Mar. 2007.

H. N. Tran, M. Hasegawa, Y. Murata, "ResourceReservation Scheme for Mobile Users in Cognitive Wireless Cloud," Technical Report of IEICE, Technical Committee on Software Radio, pp. 81-86, Mar. 2007.

* cited by examiner

COGNITIVE COMMUNICATION NETWORK SYSTEM AND COMMUNICATING METHOD THEREOF

TECHNICAL FIELD

The present invention relates to a cognitive communication network system in which communication terminals communicate with each other, while presence of connection with a plurality of wired or wireless communication networks or a connecting method is dynamically reconfigured, and a communicating method thereof; particularly to a system configuration for reconfiguring communication in each communication network.

BACKGROUND ART

Various radio access systems including mobile phones, wireless LANs, PHS and the like have spread and wireless MAN services such as WiMAX (Worldwide Interoperability for Microwave Access) (registered trademark) have started. In order to effectively utilize such access systems, research and development of a technology that hands over a different type of wireless network in a seamless manner has progressed (See Non Patent Documents 1 and 2).

Also, as disclosed in Non Patent Document 3, a software wireless technology capable of connection to a different wireless interface in order to switch to a different radio system has been studied.

Based on these technologies, limited radio resources (frequencies, wireless infrastructures) and network resources can be used more efficiently by switching to an optimal one in accordance with a state of the wireless network. Also, a throughput or capacity in total is improved by that and use efficiency of the frequency is improved.

For users, too, communication with optimal radio access is ensured all the time. For example, it is becoming possible to communicate with a mobile phone that supports high-speed movement during movement and to automatically switch to communication via a wireless LAN through an inexpensive internet line at home.

Non Patent Document 4 discloses Cognitive Wireless Cloud advocated by the applicant. The Cognitive Wireless Cloud is a cognitive wireless architecture in which a cognitive wireless terminal capable of connection to various types of networks through a plurality of radio access means autonomously collects information of a network available on the spot, obtains QoS information of each radio access or network on a real time basis, and optimizes capacity and an error rate of the entire network.

Supposing an environment in which a large number of radios are present, the total capacity is increased if a complex system as the entire network including the terminal is in an optimal state. As a result, a bit rate per frequency is improved, and the frequency use efficiency is improved.

The cognitive wireless network can be considered as a technology to form such optimal state while switching various types of radios.

In the past, when the measurement information of a radio system is to be collected or the setting is to be changed from a managing device, a function or information unique to the respective radio systems has been used. Therefore, in a device that integrates and manages radio access systems with different communication methods and management methods, devices developed for each radio system or network administrator are used.

Thus, functions in the device are different and interfaces between the devices cannot be made common. For this reason, it has been difficult to develop a general-purpose device that manages reconfiguration of various types of radio access devices.

As an example, IEEE 802.21 (See Non Patent Document 5) formulates specification to realize a handover, not relying on a type of radio, and has a function to control the handover by absorbing the type of radio. However, it relates to connection or disconnection of the wireless link and collection of wireless information and is not intended to optimize the radio access network.

Also, IEEE1900.4, which is a standard specification that defines a basic architecture and a function to optimally use radio resources by distributing decision making over the networks and terminals, was published on Feb. 27, 2009 (See Non Patent Document 6).

This specification will be described later, but in brief, in the previous proposals, the networks and the terminals are configured such that connecting methods can be reconfigured, respectively.

In connection with the present invention, the inventors have published many papers. For example, Non Patent Document 7 discloses a technology in which a terminal autonomously recognizes an available network, Non Patent Document 8 is a technology to obtain the respective network QoS information on a real time basis, and Non Patent Document 9 is a technology to make efficient radio resource reservations for a seamless handover that can support high-speed movement, respectively.

Also, related patent documents include Patent Document 1 that discloses a software wireless communicating device. This software wireless communicating device can support a plurality of frequencies and wireless methods by switching the software, since the received wave is analog-digital and converted by an AD converter once and a demodulation portion is handled by a digital signal processor or a microprocessor and the software.

The disclosed Patent Documents relating to the cognitive wireless system include Patent Document 2 that discloses a configuration to notify an empty wireless channel to a terminal device and particularly Patent Document 3 that proposes a method of determining presence of a radio wave.

CITATION LIST

Patent Literature

Patent Document 1: Japanese Unexamined Patent Application Publication No. 2003-152732
Patent Document 2: Japanese Unexamined Patent Application Publication No. 2007-300419
Patent Document 3: Japanese Unexamined Patent Application Publication No. 2009-177403

Non Patent Literature

Non Patent Document 1: G. Wu, P. Havinga and M. Mizuno, "MIRAI Architecture for Heterogeneous Networks," IEEE Comm. Mag., pp. 126-134, 2002
Non Patent Document 2: M. Inoue, K. Mahmud, H. Murakami, M. Hasegawa and H. Morikawa, "Novel Out-Of-Band Signaling for Seamless Interworking between Heterogeneous Networks," IEEE Wireless Commun. Vol. 11, No. 2, pp. 56-63, 2004

Non Patent Document 3: H. Harada, "Software defined radio prototype toward Cognitive Radio Communication Systems," IEEE Dyspan 2005, Vol. 1, pp. 539-547, 2005

Non Patent Document 4: Masahiro Kuroda, Yoshitoshi Murata, Hiroshi Harada, Shuzo Kato, "Cognitive Wireless Cloud (1) ~Architecture~," Technical Report OF IEICE, Technical Committee on Software Radio, March 2007

Non Patent Document 5: IEEE P802.21 D8.0, http://www.ieee802.org/21/

Non Patent Document 6: "IEEE Standard for Architectural Building Blocks Enabling Network-Device Distributed Decision Making for Optimized Radio Resource Usage in Heterogeneous Wireless Access Networks," IEEE 1900.4-2009, February 2009

Non Patent Document 7: Goh Miyamoto, Kentaro Ishizu, Mikio Hasegawa, Yoshitoshi Murata, "Cognitive Wireless Cloud (2) ~Data Collection Method for Discovering Radio Resources~," Technical Report OF IEICE, Technical Committee on Software Radio, March 2007

Non Patent Document 8: Yoshia Saito, Mikio Hasegawa, Yoshitoshi Murata, "Cognitive Wireless Cloud (3) ~High-speed End-to-end QoS Measuring Method~," Technical Report OF IEICE, Technical Committee on Software Radio, March 2007

Non Patent Document 9: H. N. Tran, M. Hasegawa, Y. Murata, "Resource Reservation Scheme for Mobile Users in Cognitive Wireless Cloud", Technical Report OF IEICE, Technical Committee on Software Radio, March 2007

SUMMARY OF INVENTION

Technical Problem

The present invention was made in view of the problems of the above prior-art technologies and has an object to provide a mechanism and a function of a system that can effectively use frequency resources and can determine a communication method or the like considering priority of each communication in a cognitive communication network system, such as a frequency shared type assuming that a certain frequency band is shared by a plurality of systems.

Solution to Problem

The present invention uses the following means in order to solve the above problems.

That is, the present invention is a cognitive communication network system in which communication terminals conduct communication while presence of connection with a plurality of wired or wireless communication networks or a connection method (hereinafter referred to as a connection method and the like) are dynamically reconfigured, in which the communication network has a plurality of radio access networks and a superior communication network that provides a common platform to at least the radio access network.

In this configuration, first, RAN communication state obtaining means that collects information relating to a communication state in a radio access network (RAN) is provided. Then, on the superior communication network, on the basis of the information collected by the RAN communication state obtaining means, network reconfiguration managing means that reconfigures at least either one of selection of the radio access network to be used for communication or a communication condition in the radio access network is provided.

On the other hand, at least one of the selections of the base station to be used for the communication or the communication condition in the base station on the basis of the information collected by the base-station state obtaining means is provided in a plurality of base stations on at least a part of the radio access network base-station state obtaining means that collect information relating to the state of the base station itself or the communication state in that base station and base-station communication reconfiguration managing means that reconfigure.

In the above base station, base-station setting means that set the connection methods and the like in the base station on the basis of a decision of the network reconfiguration managing means and the base-station communication reconfiguration managing means may be provided.

The above radio access network, maybe configured so that inter-base station communicating means capable of exchanging a state at each base station or a reconfiguration result of base-station communication is provided by connecting the base-station communication reconfiguration managing means of each base station.

Network-base station communicating means that exchange at least either one of information relating to the superior communication network or information relating to the state of the base station may be provided by connecting the network reconfiguration managing means and the base-station communication reconfiguration managing means to each other.

In the cognitive communication network system of the present invention, it may be so configured that the base stations exchange the state in each base station or the reconfiguration result of the base-station communication with each other through the network reconfiguration managing means using the network-base station communicating means.

The above communication terminal provides communication-terminal state obtaining means that collect information relating to the state of the communication terminal itself, or the communication state and communication-terminal reconfiguration managing means that reconfigure the communication condition in the communication terminal on the basis of the information collected by the communication-terminal state obtaining means.

The cognitive communication network system of the present invention may be configured so that communication terminal-base station communicating means that exchange at least either information relating to the state of the base station or information relating to the state of the communication terminal, is provided by connecting the communication-terminal reconfiguration managing means and the base-station communication reconfiguration managing means to each other.

In the cognitive communication network system of the present invention, inter-communication-terminal communicating means capable of exchanging information relating to the state of the communication terminal with each other may be provided by connecting the communication-terminal reconfiguration managing means of the communication terminals to each other.

The present invention can be provided as a base station used in the cognitive communication network system provided with the above configuration.

That is, the present invention is the base station of the radio access network characterized in having the base-station state obtaining means that collect information relating to the state of the base station itself or the communication state in the base station and the base-station communication reconfiguration managing means that reconfigure at least either one of selection of the base station to be used for the communication or the communication condition in the base station on the basis of the information collected by the base-station state obtaining means.

The present invention may provide a method of communication in the above cognitive communication network system. A configuration in which the communication network has a plurality of radio access networks and a superior communication network that provides a common platform to at least the radio access network is characterized by:

(S01) a RAN communication state obtaining process in which the RAN communication state obtaining means collect information relating to the communication state in the radio access network (RAN); and (S02) a network reconfiguration managing process in which the network reconfiguration managing means on the superior communication network reconfigure at least one of a selection of the radio access networks to be used for the communication or the communication condition in the radio access network on the basis of the information collected by the RAN communication state obtaining means and is executed at a predetermined trigger, and in a plurality of base stations on at least apart of the radio access network, (S11) a base-station state obtaining process in which the base-station state obtaining means collect information relating to a state of the base station itself or the communication state in the base station; and (S12) a base-station communication reconfiguration managing process in which the base-station communication reconfiguration managing means reconfigure at least one of a selection of the base stations to be used for the communication, or the communication condition in the base station is executed at a predetermined trigger on the basis of the information collected by the base-station state obtaining means.

In the above radio access network, (S13) an inter-base station communication process in which the inter-base station communicating means connects with the base-station communication reconfiguration managing means of each base station and exchanges either the state in each base station or the reconfiguration result of the base-station communication may be provided.

In the superior communication network, (S03) a network-base station communication process in which the network-base station communicating means exchange at least one of either the information relating to the superior communication network or the information relating to the base station, by connecting the network reconfiguration managing means and the base-station communication reconfiguration managing means may be provided.

It may be configured so that the base stations exchange the state in each base station or the reconfiguration result of the base-station communication through the network reconfiguration managing means using the network-base station communicating means.

In the communication terminal, the above communicating method has:

(S21) a communication-terminal state obtaining process in which the communication-terminal state obtaining means collects information relating to a state of the communication terminal itself or the communication state; and (S22) a communication-terminal reconfiguration managing process in which the communication-terminal reconfiguration managing means reconfigures the communication condition in the communication terminal on the basis of the information collected by the communication-terminal state obtaining means may be provided.

The above communicating method, may be configured so that the communication terminal-base station communicating means exchange at least one of either the information relating to the state of the base station or the information relating to the state of the communication terminal by connecting the communication-terminal reconfiguration managing means and at least the base-station communication reconfiguration managing means.

The above communicating method, may be configured so that the inter-communication terminal communicating means exchange information relating to the state of the communication terminal by connecting the communication-terminal reconfiguration management means of each communication terminal to each other.

Advantageous Effects of Invention

The present invention provided with the above configuration exerts the following effects.

That is, since the base station in the radio access network is provided with the base-station state obtaining means and the base-station communication reconfiguration managing means, the radio access network itself can make a decision and optimize the selection of the base station and the communication condition in the base station. As a result, autonomous reconfiguration of the communication conditions and the like in the radio access network, which has been impossible in the prior-art cognitive communication network, is enabled.

Since the inter-base station communicating means exchange the state in each base station or the reconfiguration result of the base-station communication with each other, so that the reconfiguration of the communication conditions and the like in the radio access network are performed in a collaborative manner, contribution can be made to more efficient reconfiguration processing.

Since the network-base station communicating means connects the network reconfiguration managing means and the base-station communication reconfiguration managing means, contribution can be made to a collaborative operation between the radio access network and the superior network. Also, the radio access networks can perform the collaborative operation through the superior network.

Since the communication terminal is provided with the communication-terminal state obtaining means and the communication-terminal reconfiguration managing means and further with the communication terminal-base station communicating means, the communication conditions and the like of the base station can be notified to the communication terminal. Also, contribution can be made to the collaborative operation through exchange of the information of each communication terminal such as an inquiry from the communication terminal to the base station, a usage state of the frequency in the communication terminal and the like.

Since the inter-communication terminal communicating means is provided, by connecting the communication-terminal reconfiguration managing means of each communication terminal to each other, they can exchange the information relating to the state of the communication terminal with each other.

DESCRIPTION OF EMBODIMENTS

An embodiment of the present invention will be described below referring to an embodiment shown in the attached drawings. The embodiment is not limited to the following.

Figure 1:
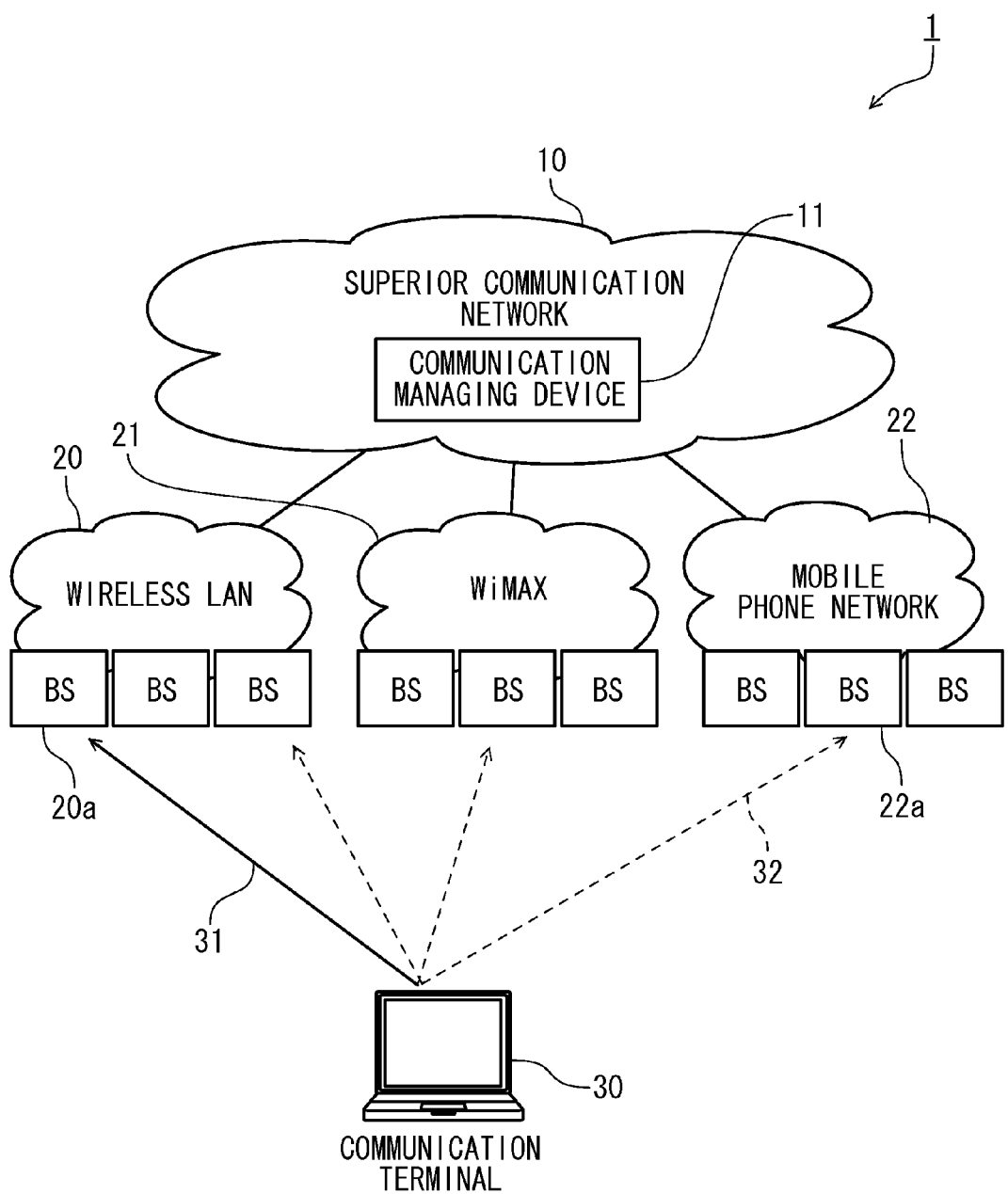
FIG. 1 is a configuration diagram of a cognitive communication network system according to the present invention.

FIG. 1 is a configuration diagram illustrating a specific example of a cognitive communication network system (1) according to the present invention. In the cognitive communication network, a communication network is constituted by a superior communication network (10), which is a packet-based network, and a plurality of radio access networks (20), (21), and (22) to which the superior communication network (10) provides a common platform. Then, a cognitive communication terminal (hereinafter referred to as a communication terminal) (30) connected to the radio access network is connected to the superior communication network (10). The superior communication network is assumed to be an IP network such as the Internet, for example.

In the cognitive communication network, in addition to the wireless LAN (20), the WiMAX (registered trademark) (21), and the mobile phone network (22) as exemplified in the figure, the communication terminal (30) conducts communication while switching the connection destination or connecting method with one or more radio access networks such as PHS, Bluetooth (registered trademark) and the like with different frequencies, communication methods, fee systems, providers and the like. At that time, the usage state of the radio is recognized and use efficiency of the frequency is improved in this technology.

In order to realize this, technology to search an available frequency/radio system and switch to an optimal system (heterogeneous type) and technology to detect an unused frequency band/time slot and the like and use it within a range not interfering with an existing system (frequency shared type) is used. In the present invention, a cognitive communication network system mainly using the latter technology is intended, but the present invention may be applied to the former system or a system combining both.

Each radio access network provided with a plurality of base stations (BS), as well known, conducts radio communication with the communication terminal (30). The radio access network may have, for example, wireless LANs, not shown, connected under the superior wireless LAN (20) and hierarchized. In this case, too, by providing an IP network capable of communication with an IP protocol, the communication terminals connected to any radio access network can conduct communication in an end-to-end manner.

In the cognitive communication network system of the present invention, the communication terminal (30) changes the radio access networks (20) to (22) as the connection destinations and makes decisions, such as switching the frequency, and performs reconfiguration on the basis of information relating to a communication state of the terminal, preference of a user, and the user's context. Such information is reported to a communication managing device (11) of the superior communication network (10) and enables a collaborative operation with the communication network side. In the communication managing device (11), on the basis of the information received from the communication terminal (30) combined with the states of the superior network (10) and the radio access networks (20) to (22), the communication method and the like with the communication terminal (30) can be decided and reconfigured.

An explanation will be made using a specific example in FIG. 1. First, suppose that connection (31) is made to a base station (20a) in the wireless LAN (20). When the communication terminal (30) moves outside a communication area of the base station (20a), the communication terminal (30) determines the subsequent connection destination in accordance with the communication state of the terminal itself, preference of the user and the like. For example, if a base station (22a) of the mobile phone network (22) is in the subsequent priority order, reconfiguration processing to switch to the connection (32) is performed. The result is transmitted to the communication managing device (11), the reconfiguration processing is also performed on the communication network side, and packet communication at the communication terminal (30) is continued.

On the other hand, in the communication managing device (11), too, the communication method and the like with the communication terminal (30) can be reconfigured. For example, if traffic in the mobile phone network (22) is found to be excessive by monitoring of the state of the radio access network, the connection destination of the communication terminal (30) is switched to the communication via the WiMAX (registered trademark) (21). This reconfiguration result is notified to the communication terminal (30) and the reconfiguration processing is also performed at the communication terminal (30).

In the case of the frequency shared type cognitive communication network system, since an empty frequency band not used in the communication is used, if an original user of the frequency band is to conduct communication, it is necessary to move the communication to a different frequency band. By obtaining a usage state of each frequency band in the communication terminal (30) and the communication managing device (11), a frequency band or a modulation method to be used is reconfigured.

In the cognitive communication network system, various communication networks and frequency resources can be effectively utilized while the communication network side and the communication terminal are in collaboration with each other, as in this specific example, also considering the preference of the user.

Figure 2:
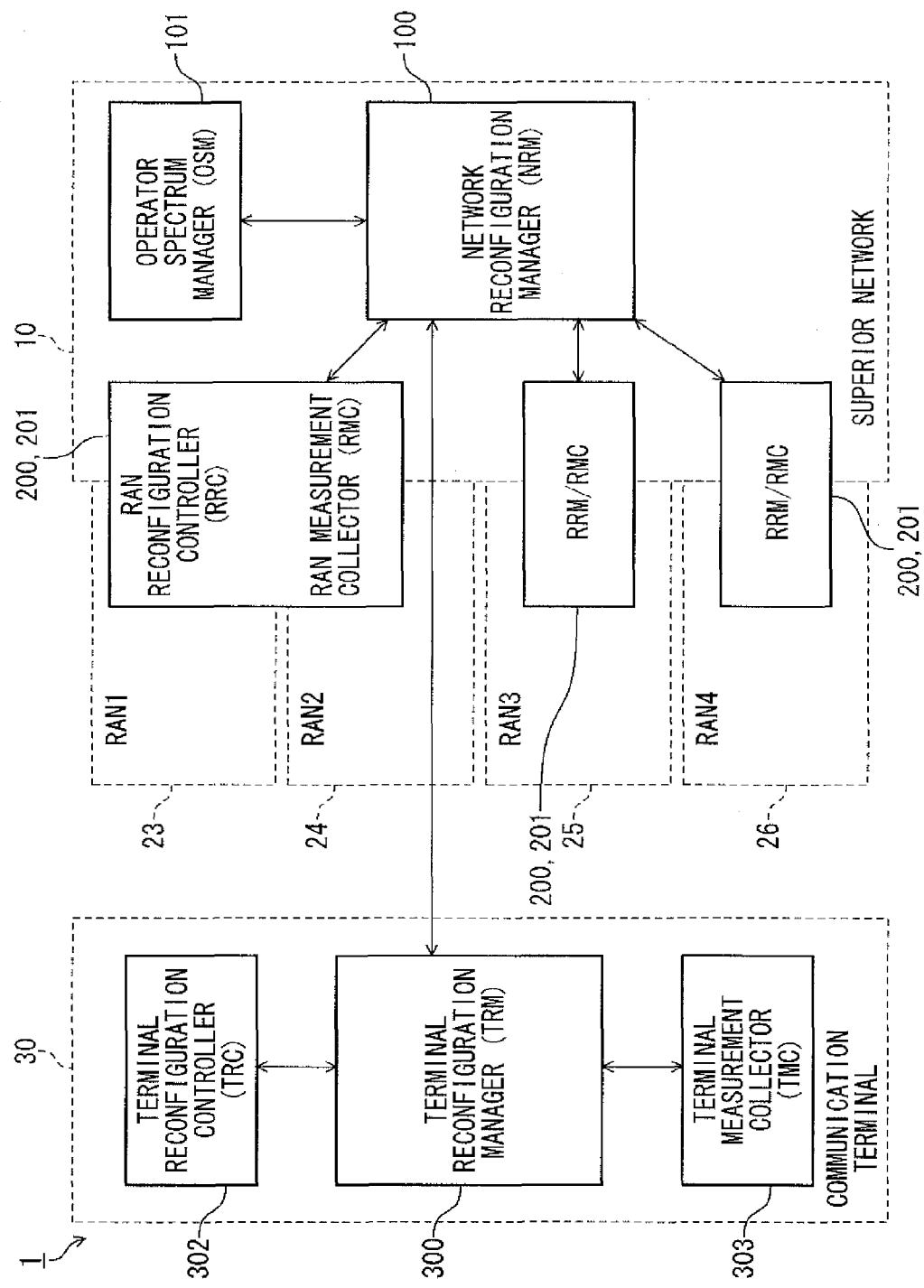
FIG. 2 shows architecture of a prior-art cognitive communication network system.

Subsequently, a network system of IEEE1900.4, which is a technology on which the present invention is based will be described. FIG. 2 is a block diagram of system architecture already disclosed.

The communication network side is constituted by the superior network (10) and a plurality of the radio access networks (RAN) to which the superior network (10) provides a common platform. Here, four RANs, that is, RAN1 to RAN4 (23) to (26) are exemplified. In the prior-art system, decision making relating to optimal use of wireless communication is administered by two processing means, that is, a network reconfiguration manager (NRM: Network Reconfiguration Manager) (100) disposed in the superior network (10) and a terminal reconfiguration manager (TRM: Terminal Reconfiguration Manager) (300) disposed in the communication terminal (30).

That is, the network reconfiguration manager (100) determines the communication method and the like in accordance with information obtained from a RAN measurement collector (RMC: RAN Measurement Collector) (201) that obtains a communication state and the like on the RAN and a terminal reconfiguration manager (300). The determined result is set by a RAN reconfiguration controller (RRC: RAN Reconfiguration Controller) (200) and also notified to the terminal reconfiguration manager (300).

The terminal reconfiguration manager (300) also determines the communication method and the like on the basis of the information from a terminal measurement collector (TMC: Terminal Measurement Collector) (303) that obtains a communication state and the like in the communication terminal and the network reconfiguration manager (100). The determined result is set by a terminal reconfiguration controller (TRC: Terminal Reconfiguration Controller) (302) and also notified to the network reconfiguration manager (100).

In the superior network (10), an operator spectrum manager (OSM: Operator Spectrum Manager) (101) is disposed in addition to them so as to perform monitoring of the network state by a network administrator and a setting operation of a condition according to the decision of the reconfiguration. As shown in FIG. 1, the network reconfiguration manager (100) and the operator spectrum manager (101) are preferably disposed as the communication managing device (11). The communication managing device (11) can be realized as a known server device.

Here, the RAN reconfiguration controller (200) is processing means that merely changes the settings so as to realize an instructed reconfiguration and it may be a communication node that is disposed on the RAN and transmits the instruction to each base station or may be implemented in each base station. In the case of implementation, the RAN reconfiguration controller (200) is a conceptual processing means and as actual processing, it is only necessary that each base station changes its own setting in accordance with the instruction from the network reconfiguration manager (100).

The RAN measurement collector (201) is disposed in a base station or on the RAN and obtains the communication state in the base station. Here, as the communication state, arbitrary parameters that affect the communication such as traffic, a communication speed, an available frequency of the RAN, a modulation method, information relating to jitter/error rate, a position of the base station, a usage state of other frequency bands at the base station position, the number of communication terminals and the like can be used.

The RAN reconfiguration controller (200) and the RAN measurement collector (201) may be disposed as one shared by a plurality of RANs (23) and (24) or may be disposed respectively for each of the RANs (25) and (26). Also, not limited to the illustration, it may also be so configured that the RAN reconfiguration controller (200) targets a plurality of RANs and the RAN measurement collector (201) is disposed at each RAN.

The RAN reconfiguration controller (200) merely performs settings of the reconfiguration in accordance with the instruction of the network reconfiguration manager (100) and the RAN measurement collector (201) merely makes measurement and thus, they do not make any decision in the radio access network.

In this point, in the case of the above-described heterogeneous type, since the connection destination is changed for each RAN, there is no hindrance in the reconfiguration processing of the entire network even if the RAN itself does not make decisions. However, in the case of the shared frequency type or the integrated type of the both, a wireless base station needs to reconfigure the frequency band in accordance with a radio wave environment around it on the RAN, and the previously proposed architecture is not sufficient for that purpose.

In order to solve the problem, the present invention proposes introduction of a new system in which the radio access network itself can make decisions into the architecture of IEEE1900.4.

That is, it is configured so that the wireless base station can communicate with other wireless base stations on a peripheral radio wave environment, for example such as a degree of radio wave interference and information of a communication load, and can make decisions based on the information collected as above and priority of the respective wireless devices.

Figure 3:
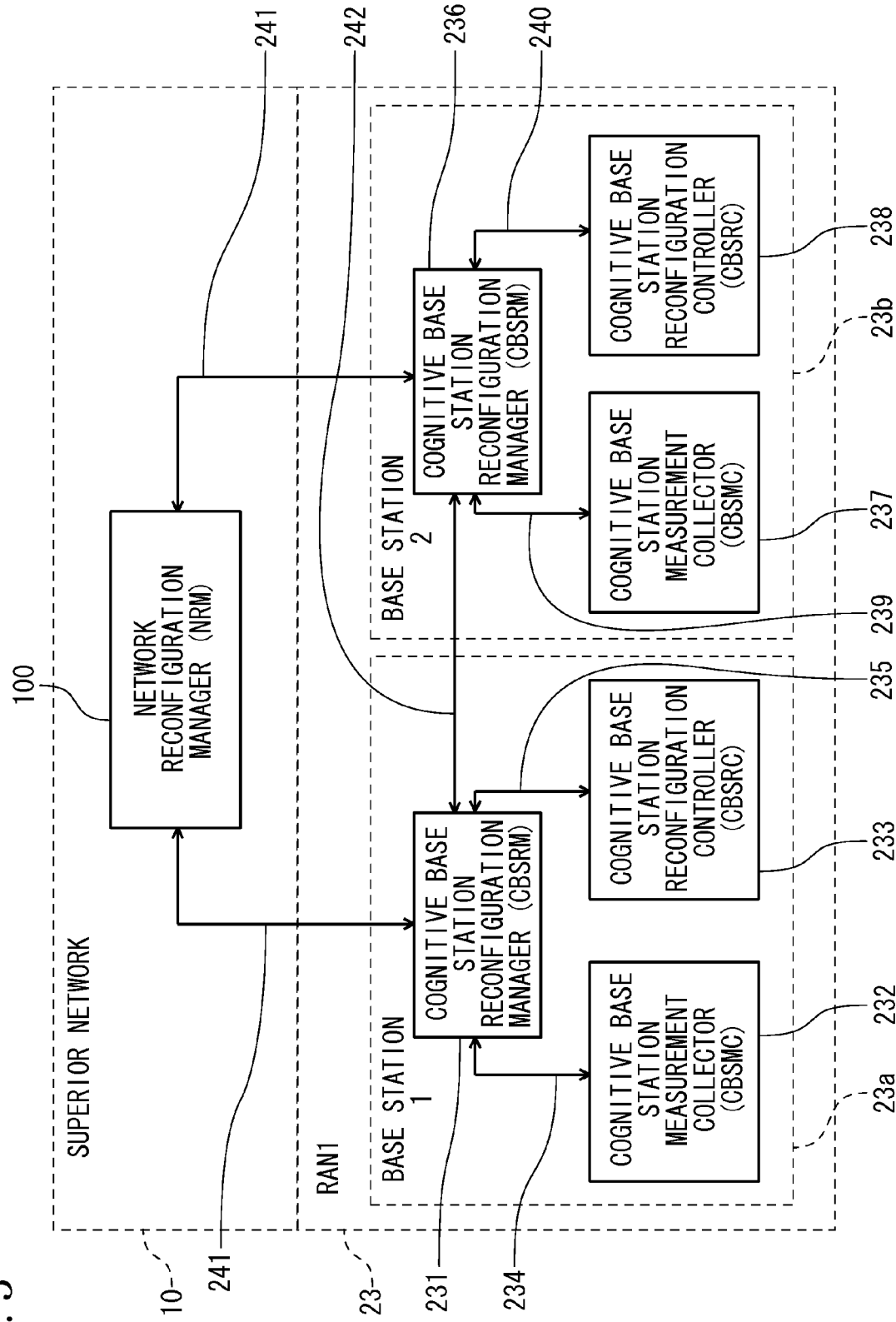
FIG. 3 is architecture of a cognitive communication network system according to the present invention.

Thus, cognitive base stations (CBS: Cognitive Base Station) (23a) and (23b) as shown in FIG. 3 are created. In the cognitive base stations (23a) and (23b), cognitive base station reconfiguration managers (CBSRM: Cognitive Base Station Reconfiguration Manager) (231) and (236), cognitive base station measurement collectors (CBSMC: Cognitive Base Station Measurement Collector) (232) and (237), and cognitive base station reconfiguration controllers (CBSMC: Cognitive base station reconfiguration controller) (233) and (238) are disposed.

Figure 4:
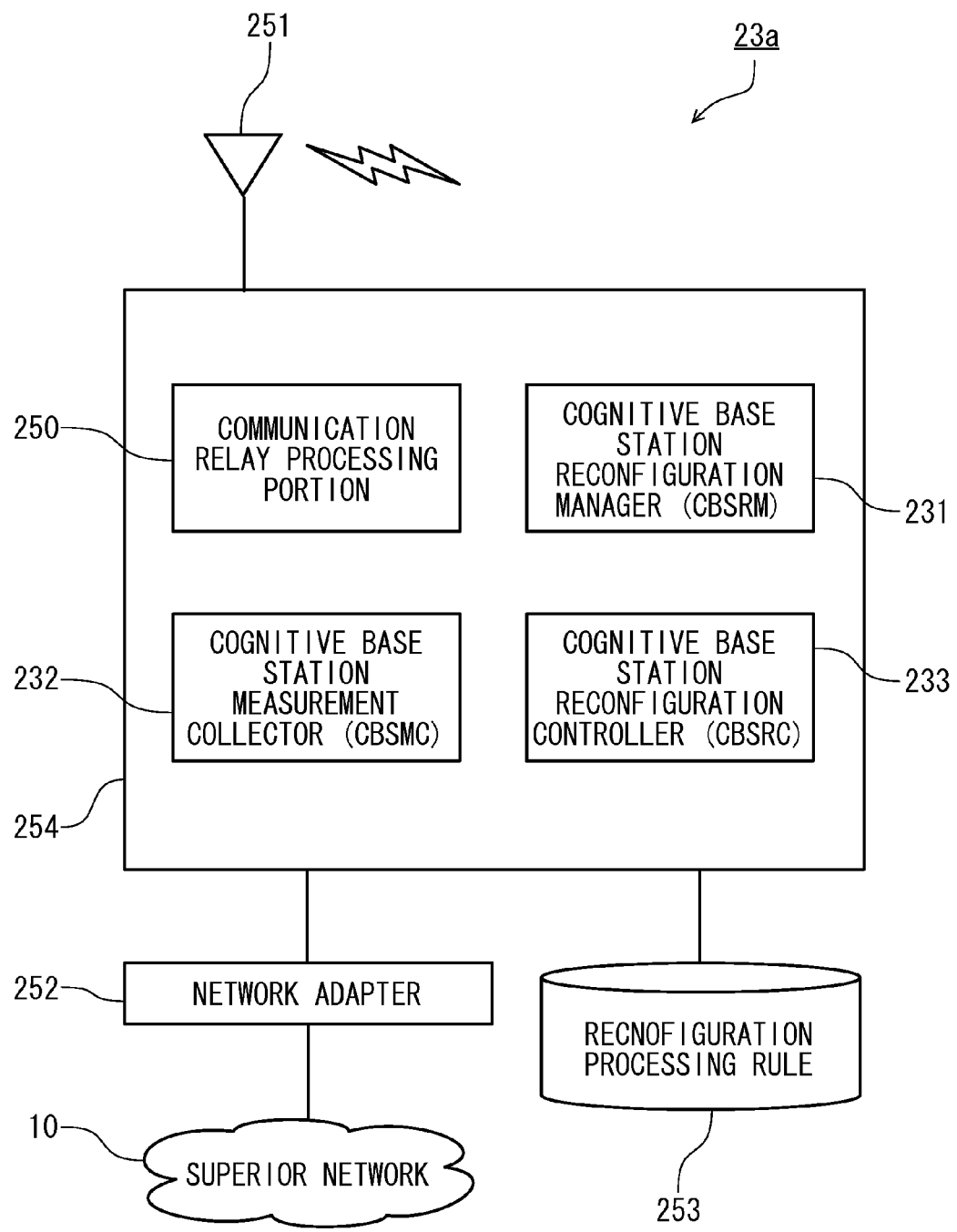
FIG. 4 is a configuration diagram of a cognitive base station according to the present invention.

Base station 1 (23a) will be described below as an example. FIG. 4 shows a configuration diagram of the cognitive base station (23a) according to the present invention. This cognitive base station (23a) can be easily realized by a known wireless LAN access point, a base station of WiMAX or mobile phone, a known personal computer and the like and it is provided with a CPU (254) and a memory (not shown) as known, and administers execution processing required to realize the function of the present invention.

For example, in a wireless LAN adapter, a communication relay processing portion (250) that relays and processes wireless communication contents with the communication terminal (30) with the superior network (10) is provided, and a function to route the communication from the communication terminal to an external network, a DHCP server function to allocate an IP address to the communication terminal, a NAT function for address conversion, a DNS server function (DNS forward function) to convert a domain name and the IP address and the like are mounted thereon.

In addition, the CPU (254) is provided with the above-described cognitive base station reconfiguration manager (231), the cognitive base station measurement collector (232), and the cognitive base station reconfiguration controller (233).

Also, an antenna (251) for communication with the communication terminal (30) and a network adapter (252) for communication with the superior network (10) are provided. Also, storage means (253) such as a memory and a hard disk is provided.

In this configuration, the cognitive base station reconfiguration manager (231) obtains information on the communication state from the cognitive base station measurement collector (232). At this time, an inquiry may be made about a state regularly from the cognitive base station reconfiguration manager (231) or at a predetermined trigger to the cognitive base station measurement collector (232) or the state may be measured all the time or with a certain interval by the cognitive base station measurement collector (232) and communication may be made with the cognitive base station reconfiguration manager (231) in case of a change.

The cognitive base station measurement collector (232) obtains the frequency in use, traffic, the communication speed, the number of connected communication terminals, the type of application conducting communication at the communication terminal and the like by measuring a usage state of the peripheral frequency band by the antenna (251) and monitoring the communication by the communication relay processing portion (250) or the network adapter (252).

It is only necessary to scan the frequency band to be monitored for the usage state of the frequency band, and radio wave intensity may be measured at that time. The same applies to the frequency in use.

The information collected by the cognitive base station measurement collector may be the parameters shown in the following Table 1, for example. This list is only an example and can be arbitrarily defined.

TABLE 1

| Displayed name | Description | Unit |
|---|---|---|
| MacAddr | Wireless I/F side MAC wireless I/F side MAC address | |
| IpAddr | Wired side IP address | |
| SSID | SSID | |
| Latitude | Latitude | degree |
| Longitude | Longitude | degree |
| Altitude | Altitude | m |
| Channel | Channel | |
| MaxBw | Maximum band width | bps |
| AvailableBw | Available band width | bps |
| RxBitRate | Uplink use band | bps |
| TxBitRate | Downlink use band | bps |
| Delay | Delay | msec |
| Jitter | Jitter | msec |
| LossRate | Loss rate | % |
| Coverage | Coverage | m |
| Cost | Cost | Yen/MB |
| NumOfUsers | Number of users | |
| PoBSRate | Problem report rate | % |

In the case of measurement from the communication relay processing portion (250), the traffic, the communication speed, the destination IP address, the number of communication terminals, the contents of the packets, information of the destination port numbers, the type of the application and the like can be obtained by monitoring the packets during the communication.

Particularly, a method of classification into voice calls, video streaming, file transfer and other applications so as to specify the type will be described. Such classification is made because, according to the finding by the inventors, mere high throughput in these applications does not necessarily mean a high communication quality on the applications and the type needs to be selected also considering a loss or a jitter of the packets at each base station.

As for the voice call, if a series of packets having the same destination address with an average throughput less than 32 kbps and lasting for 2 seconds or more in the relayed UDP (User Datagram Protocol) packets is detected, it is detected that an application of a voice call is being executed.

As for the video streaming, if a series of packets having the same destination address with an average throughput of 32 kbps or more and lasting for 2 seconds or more in the relayed UDP packets is detected, it is detected that an application of the video streaming is being executed.

As for the file transfer for downloading or uploading with another server, if the communication terminal is transmitting or receiving TCP (Transmission Control Protocol) packets, the destination port number is any one of 80, 21 or 20 and a series of packets having the same destination address with an average throughput of 32 kbps or more and lasting for 5 seconds or more is detected, it is detected that an application of the file transfer is being executed.

If any one of the above is not applicable, it is classified as one of the other applications.

The modes of these packets are stored as a packet mode database in the storage means (253).

TABLE 2

(Packet mode database)

| Protocol | Average throughput | Duration | Destination port no. | Type |
|---|---|---|---|---|
| UDP | Less than 32 kbps | 2 seconds or more | Unknown | Voice call |
| UDP | 32 kbps or more | 2 seconds or more | Unknown | Video |
| TCP | 32 kbps or more | 5 seconds or more | 80/20/21 | File transfer |
| Unknown | Unknown | Unknown | Unknown | Others |

In the cognitive base station reconfiguration manager (231), the reconfiguration contents such as the communication method are determined in accordance with the measurement result of the cognitive base station measurement collector (232) and in compliance with a reconfiguration processing rule (253). In the case of the frequency shared type mainly intended by the present invention, since the usage state of the peripheral frequency band is the most important parameter, this will be described first.

If another communication (wave interference) is detected by the antenna (251) in the currently used frequency band, the frequency and the communication modulation method need to be reconfigured in accordance with the priorities of the communication and the current communication.

Thus, the priorities according to the communication terminal for each frequency band and modulation method are defined in the reconfiguration processing rule. An example is the following Table 3.

TABLE 3

(Priority information of communication)

| Communication terminal | Frequency band in use | Time zone | Priority |
|---|---|---|---|
| A | 2.4 GHz | All day | 2 |
| A | 5.2 GHz | 9:00 to 17:00 | 2 |
| B | 2.4 GHz | All day | 3 |
| B | 5.2 GHz | 9:00 to 17:00 | 1 |

The communication terminal specifies a MAC address, account information of the communication at login of the communication terminal, cookie information in a web browser and the like by an arbitrary method. Then, suppose that during communication with the communication terminal A using the 2.4 GHz band, it is detected that the communication terminal B starts using the same frequency band.

At this time, referring to the reconfiguration processing rule (253), the priority in the 2.4 GHz band is 2 for A and 3 for B the entire day, which means that A is higher, and the communication is continued.

On the other hand, if the 5.2 GHz band is in use, the priority is 1 for B and 2 for A, and so communication with A is reconfigured.

At this time, the cognitive base station reconfiguration manager (231) determines reconfiguration to the 5.2 GHz band and notifies it to the cognitive base station reconfiguration controller (233) so that the frequency used between this cognitive base station (23a) and the communication terminal (30) is changed to the 5.2 GHz band.

The priority information can be defined as above in accordance with the time zone. For example, it can be so set that the priority of the communication terminal for business use is set higher during the business hour zone, while it is set lower outside the business hour zone.

In this case, since the priorities can be changed even for the same communication terminal depending on the current time, contribution can be made to utilization of flexible network resources according to the importance of the communication terminal.

Here, the simplest example in which the priority information is stored in the reconfiguration processing rule (253) is shown, but a communication path (242) as inter-base station communicating means may be disposed between the cognitive base station reconfiguration managers (231) and (236) of each base station in the present invention. The communication path (242) maybe outbound using an exclusive line. An exclusive frequency may be allocated. Since a data amount is small, a low-speed communication method may be used.

Inbound communication using exchange through usual packet communication or a known common signaling technology (G. Wu et al., "MIRAI Architecture for Heterogeneous Network", IEEE Communications Magazine, Vol. 40, NO. 2, 2002) is also possible.

Various types of information can be exchanged through the communication path (242) between the base stations. In the present invention, any arbitrary information used by the cognitive base station reconfiguration manager (231) in determining the reconfiguration contents or at least any of the information relating to the reconfiguration results can be exchanged.

For example, the measurement results at each base station do not necessarily match each other as for the information relating to wave interference obtained by the cognitive base station measurement collector (232). In this case, the information relating to wave interference is exchanged between the base stations of the same radio access network so that the collaborative reconfiguration contents can be determined.

The wave interference particularly matters in a case in which the frequency which should have been used by another system is to be primarily used in the cognitive communication as mentioned above and a case in which a proximate channel is used in the wireless LAN. Here, for facilitation of the explanation, the wave interference by the wireless LAN channel will be used as an example.

Suppose that the peripheral frequency usage states of each cognitive base station measurement collector (232) and (237) are as shown in Table 4. Here, the channels in the table represent channel numbers of IEEE802.11b or 802.11g.

TABLE 4

(Measurement result)

| 1 ch | 2 ch | 3 ch | 4 ch | 5 ch | 6 ch | 7 ch | 8 ch | 9 ch | 10 ch | 11 ch |
|------|------|------|------|------|------|------|------|------|-------|-------|
| Yes  | Yes  |      |      | Yes  |      |      |      |      |       | Yes   |

As the result of measurement, if it is found that each base station uses the channels 2, 3, 6, and 11, empty channels before and after each channel are made into a table. Table 5 is the result.

TABLE 5

(Empty channel table)

| Channel | Preceding empty channel no. | Subsequent empty channel no. |
|---------|----------------------------|------------------------------|
| 1 ch    | 4                          | 0                            |
| 2 ch    | x                          | x                            |
| 3 ch    | x                          | x                            |
| 4 ch    | 0                          | 1                            |
| 5 ch    | 1                          | 0                            |
| 6 ch    | x                          | x                            |
| 7 ch    | 0                          | 3                            |
| 8 ch    | 1                          | 2                            |
| 9 ch    | 2                          | 1                            |
| 10 ch   | 3                          | 0                            |
| 11 ch   | x                          | x                            |

In the above, when an internal network connection processing portion (104) obtains a scan result from an internal network communication adapter (13), and makes an empty channel table, suppose that 1 ch had four empty channels prior to that and 11 ch had no empty channel after that.

In the above case, 2 ch and 3 ch are close to each other and wave interference can easily occur. So, the cognitive base station reconfiguration manager (231) changes the channel in use in the base station of the channel that matters.

This method can be determined by an arbitrary calculating method but it is preferable that calculation is made so that the numbers of empty channels between the adjacent channels in use are as uniform and large as possible, for example. Statistically, it is preferable that an average value of the empty channel numbers is large and a value of distribution is small.

However, the change of the frequency causes a delay in communication, and it is preferable that the number of changes is as small as possible. Then, according to the empty channel table, if there is an adjacent channel or a channel to be used with only one empty, the channel is moved to another empty table. In the above example, when seen from the channel numbers with smaller numbers, 3 ch is the first adjacent channel, and 3ch is moved to another empty channel. In that case, if it is moved to 4 ch, it will have 1-ch emptiness each before and after that and if it is moved to 8 ch or 9 ch, it will have 1- or 2-ch emptiness before and after. Thus, 8 ch, with larger emptiness and a smaller number, is determined as the destination.

If there is a large number of cognitive base station reconfiguration managers (231), . . . , the way the manager that will make this decision is determined is by a predetermined method. But in principle, after the information on the channel in use is shared, the cognitive base station reconfiguration manager of the base station to be moved will make the decision.

In this case, the cognitive base station reconfiguration manager of the base station that has been using 3 ch for communication carries out the above calculation and determines reconfiguration of the communication in 8 ch.

The reconfiguration contents in the cognitive base station reconfiguration manager (231) and the determining method are not limited to the above. Other than the change of the frequency, the modulation method used for the communication can be changed to a method more resistant against interference or to a method capable of high-speed communication.

If connections are concentrated to a specific base station, base stations to be connected can be changed so that the number of communication terminals becomes uniform. In this case, after it is checked that the cognitive base station measurement collector of the base station as a candidate for the movement destination is capable of communication with the communication terminal, the reconfiguration of the change of connection destination is performed.

If different communication methods are set for the base stations, the connection destination with the communication terminal can be changed in accordance with the type of application that the base station is good at. If the communication method suitable for voice communication is set at a base station, the communication with the communication terminal conducting the voice communication is reconfigured to a connection with that base station, while the communication terminal conducting another type of communication at the base station can be guided to another base station.

Moreover, the present invention can handle a configuration in which a frequency used between the base station and the communication terminal is largely changed. That is, the frequency used by the base station is not limited to the 2.4 GHz band or 5.2 GHz band allocated to the wireless LAN but a frequency band for TV broadcasting can be used in a time zone not in use or in a specific area where wave interference does not occur. The cognitive base station reconfiguration manager (231) can determine a frequency band that can be used on the basis, not only of the notification from the network reconfiguration manager (100), but also from the notification from another cognitive base station reconfiguration manager (231) and the terminal reconfiguration manager (300) and make settings of its own station.

As mentioned above, according to the present invention, since the decision making relating to the communication method and the like can be directly made by the base stations in the same radio access network, particularly in the frequency shared type cognitive communication network system, effective utilization of the frequency resources, highly efficient communication at the communication terminals and the like can be realized.

In FIG. 3, the communication paths (234) and (239) are disposed between the cognitive base station reconfiguration managers (231) and (236) and the cognitive base station measurement collectors (232) and (237). Similarly, the communication paths (235) and (240) are disposed between the cognitive base station reconfiguration managers (231) and (236) and the cognitive base station reconfiguration controllers (233) and (238).

Usually, since the processing is executed in a single base station, it is delivery of data in the CPU at the most and internal wiring with measurement equipment is sufficient. However, portions (231) to (233) of the present invention do not have to be physically installed in the base station. For example, the cognitive base station measurement collector (232) and the cognitive base station reconfiguration controller (233) can use the function provided in the existing base station and network connection with the base station can be made using the cognitive base station reconfiguration manager (231) of the present invention as an external device.

Subsequently, the communication between the cognitive base station reconfiguration manager (231) and another communication node will be described.

As shown in FIG. 3, the cognitive base station reconfiguration managers (231) and (236) can be connected to the network reconfiguration manager (100) through the communication path (241) as the network-base station communicating means.

Using communication path (241), information similar to that in communication path (242) between the base stations can be communicated and the reconfiguration contents of the network, determined by the network reconfiguration manager (100), can also be notified to each base station. Also, information such as preference set by a user in the operator spectrum manager (101) can be notified to the cognitive base station reconfiguration manager (231), and this may be stored as the reconfiguration processing rule (253).

That is, in the operator spectrum manager (101), an operation screen using a web browser is presented to the user so that the user can give instructions relating to the reconfiguration processing rule (253) from the screen.

The network reconfiguration manager (100) can provide (i) instructions to change the priority of each radio access network, (ii) instructions to forcedly switch the communication condition of each radio access network, (iii) instructions to change a switching-trigger parameter, (iv) instructions to change a report-trigger parameter of radio quality information and the like to the cognitive base station reconfiguration manager (231) on the basis of the instruction by the user.

First, (i) the instructions to change the priority of the radio access network can define the priority order and specify which will be selected if, for example, the wireless LAN and WiMAX are both available at the same time. According to this, the information on the priority as shown in Table 3 can be updated from the communication managing device (11) as appropriate.

Subsequently, (ii) the instruction to forcedly switch the communication condition of each radio access network is an instruction to have the cognitive base station reconfiguration manager (231) switch the frequency, the band, and the modulation method used in the radio access network used by the base station on the basis of the instruction from the network reconfiguration manager (100). For example, if a frequency allocated to broadcasting outside broadcasting time is used in a base station, an instruction can be made from the network reconfiguration manager (100) to the cognitive base station reconfiguration manager (231) of the base station to stop the use of the frequency and to change to another frequency when the broadcasting is started.

(iii) The instruction to change a switching-trigger parameter is an instruction to change a parameter to become a trigger to switch the communication condition to the cognitive base station reconfiguration manager (231). For example, if there is wave interference, setting of a trigger on what degree of the interference changes the frequency can be changed. In the case of the empty channel as shown in Table 4, a trigger on how many empty channels before and after switches the channel can be set.

(iv) The instruction to change a report-trigger parameter of radio quality information is an instruction to the base station of a change of a parameter that determines a trigger to report the radio quality information to the network reconfiguration manager (100). For example, if a report is transmitted to the network reconfiguration manager (100) with a 10-second interval, an instruction to change it to a 1-minute interval in order to decrease the traffic generated by this report can be made.

Also, the prior-art network reconfiguration manager (100) receives a reconfiguration result of the terminal reconfiguration manager (300) as shown in FIG. 1 and uses the information as a parameter when determining the network reconfiguration contents, but in the present invention, the reconfiguration contents are received from the cognitive base station reconfiguration manager (231) and this is also used in determining the network configuration contents.

For example, in the past, if wave interference occurs in a radio access network, processing to reconfigure the connection to another radio access network is executed, but in the present invention, the reconfiguration processing to eliminate the wave interference between the base stations is executed, and as a result, there might be a case in which the network reconfiguration is not required.

FIG. 5 are diagrams illustrating embodiments of a connection mode between the cognitive base station reconfiguration manager (CBSRM) and the network reconfiguration manager (NRM).

Figure 5A:
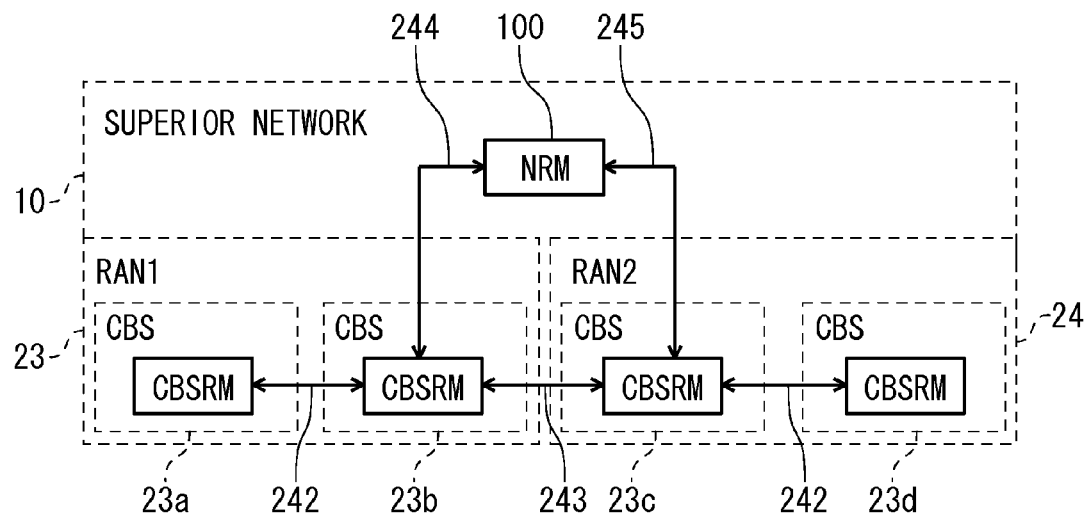
FIG. 5 is an explanatory diagram of a connection mode of a base station reconfiguration manager and a network reconfiguration manager.

In FIG. 5A, the single network reconfiguration manager (100) is disposed in the superior network (10), and the CBSRM and the NRM in one cognitive base station (23b) (23c) in the RAN1 (23) and the RAN2 (24) are connected by the communication paths (244) and (245). Here, the CBSRMs of the cognitive base stations (23a) and (23b) as well as (23c) and (23d) in the same radio access network are connected through the communication path (242) similarly to the above.

The characteristics in this embodiment are that the communication path (243) is also disposed between the CBSRMs of the different radio access networks. In the case of the radio access networks (23) and (24) present in overlapping areas, the same effect as above is exerted by exchange of information by the CBSRMs between the different RANs.

Figure 5B:
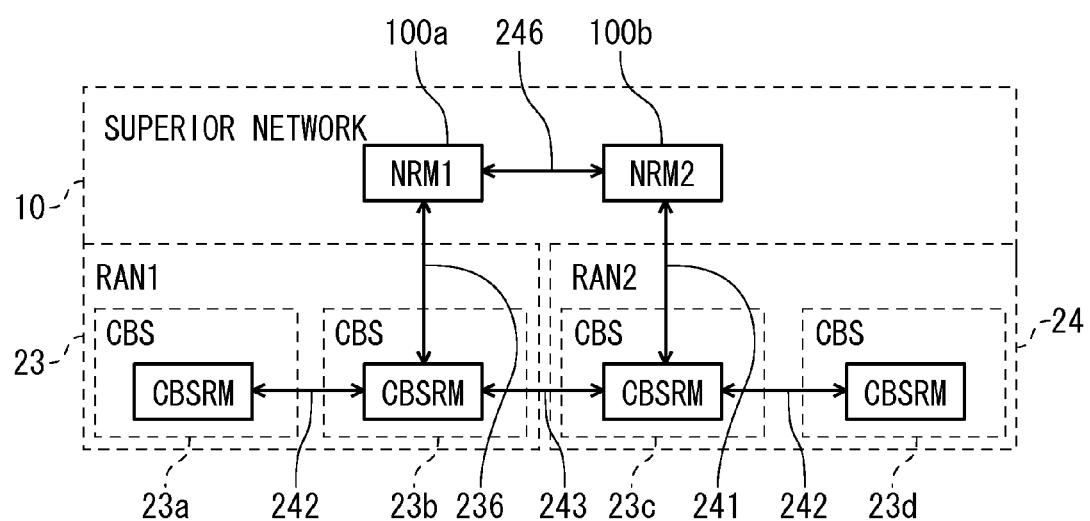

FIG. 5B shows a case in which the plurality of network reconfiguration managers (100a) and (100b) are disposed in the superior network. The superior network (10) is a large-scale network such as the Internet, and the communication managing device (11) with a different administrator might be disposed. In that case, too, the communication path (246) is disposed between the network reconfiguration managers (100a) and (100b), and the same configuration as above can be realized through exchanging information by the network reconfiguration managers (100a) and (100b) corresponding to each of the RANs (23) and (24).

Subsequently, a message sequence between the network reconfiguration manager (100) and the cognitive base station reconfiguration manager (231), as well as between the cognitive base station measurement collector (232) and the cognitive base station reconfiguration controller (233), will be described.

Figure 6:
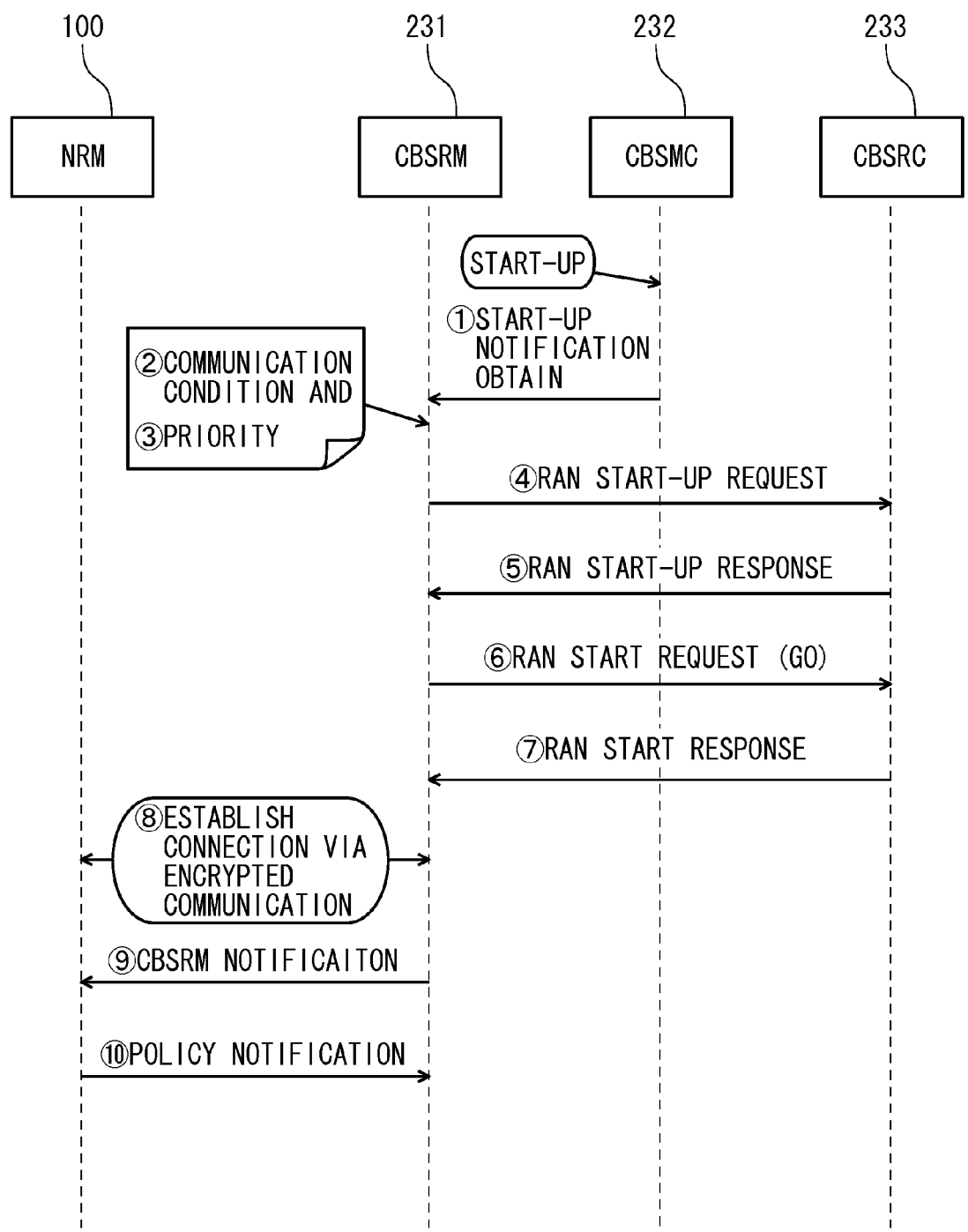
FIG. 6 is a sequence diagram between the base station reconfiguration manager and the network reconfiguration manager.

(a) If the Base Station is Started Up:

As shown in FIG. 6, if a base station is started up, the cognitive base station measurement collector (232) detects that and sends a start-up notification to the cognitive base station reconfiguration manager (231). The cognitive base station reconfiguration manager (231) obtains communication conditions such as an available protocol, a frequency and the like and the respective priorities from the reconfiguration processing rule (253).

According to this information, the start-up is affected with the communication conditions in the order of priority, thus a RAN start-up request is sent to the cognitive base station reconfiguration controller (233), and its response is returned.

In order to communicate with the network reconfiguration manager (100) with respect to top priority communication conditions, a RAN start request (GO) is sent to the cognitive base station reconfiguration controller (233) so as to bring the RAN in an operative state (GO). If connection of the RAN is established by the response, the cognitive base station reconfiguration manager (231) and the network reconfiguration manager (100) communicate with each other, and connection is made to the network reconfiguration manager (100) with a fixed host name using encrypted communication (SSH, HTTPS and the like) through the path (241).

In order for the network reconfiguration manager (100) to identify the cognitive base station reconfiguration manager (231), the cognitive base station reconfiguration manager (231) notifies the presence of a base station, identification number, and the like to the network reconfiguration manager (100).

In order to determine a network policy, the network reconfiguration manager (100) notifies the network policy of the cognitive base station reconfiguration manager (231).

If the network policy received by the cognitive base station reconfiguration manager (231) includes a host name of the network reconfiguration manager (100), which is an appropriate connection destination, and a change of the connection destination is needed, the network reconfiguration manager (100) as the connection destination is changed.

(b) If a Constant-Cycle Timer is Started:

Timer means, not shown, is used in a base station, and in a predetermined timer cycle, the cognitive base station reconfiguration manager (231) sends the information of the base station obtained by the cognitive base station measurement collector (232) to the network reconfiguration manager (100).

Figure 7:
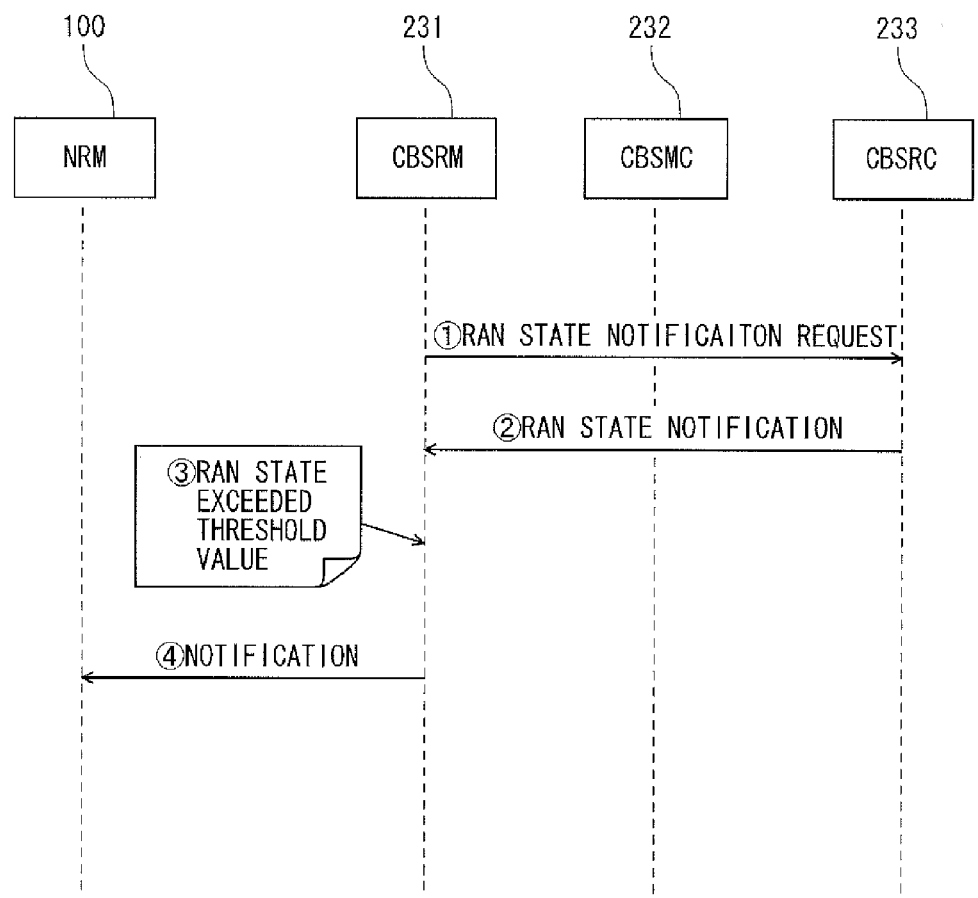
FIG. 7 is a sequence diagram between the base station reconfiguration manager and the network reconfiguration manager.

(c) If an Event Occurs:

As shown in FIG. 7, a request to notify a state of the managed RAN is sent from the cognitive base station reconfiguration manager (231) to the cognitive base station reconfiguration manager (233). When a measurement result is sent by the cognitive base station reconfiguration controller (233) to the cognitive base station reconfiguration manager (231) as a response to that, the cognitive base station reconfiguration manager (231) checks if it exceeds a threshold value set in advance or not, and if the value is exceeded, the fact is notified to the network reconfiguration manager (100).

Figure 8:
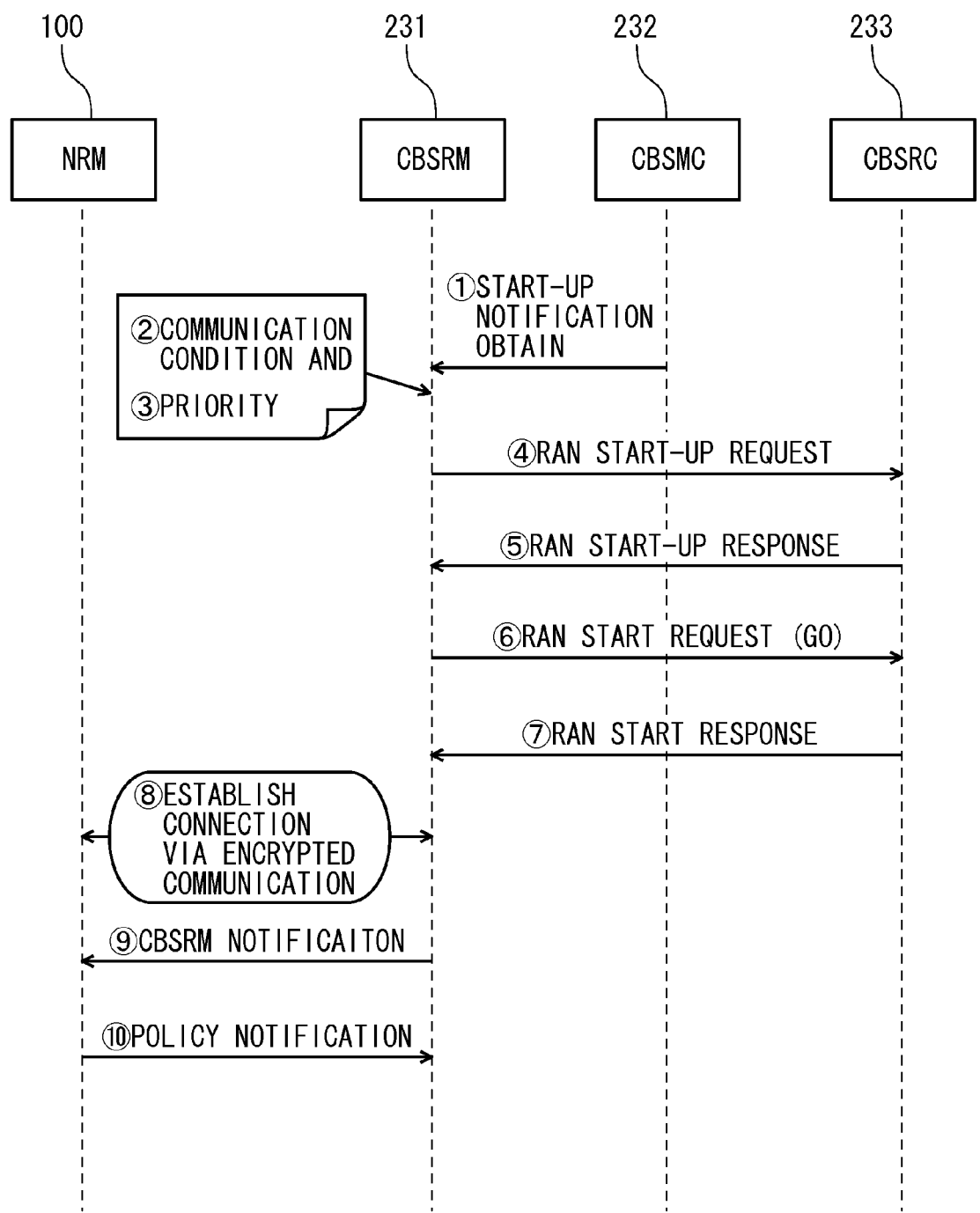
FIG. 8 is a sequence diagram between the base station reconfiguration manager and the network reconfiguration manager.

(d) If the Measurement Information Satisfies a Reconfiguration Start Condition:

As shown in FIG. 8, processing, in which a communication state of the RAN is notified from the cognitive base station measurement collector (232) to the cognitive base station reconfiguration manager (231), with a predetermined cycle and a reconfiguration condition that is satisfied will be described.

The reconfiguration conditions can include:

1) Detections of output power from the base station that are no more than a set value continuously exceeding a specified number;
2) Detections of sensitivity at the base station that are no more than a set value continuously exceed a specified number;
3) Detections of a connection quality of the RAN that are no more than a set value continuously exceed a specified number; and
4) Time and the number of times of wave interference that are detected no less than set values.

If these reconfiguration conditions are satisfied, a RAN stop request is transmitted from the cognitive base station reconfiguration manager (231) to the cognitive base station reconfiguration controller (233) in order to stop the RAN communication, and its response is returned.

Similarly at the start-up, in order to start up under the communication conditions in the order of priority in accordance with the information in the reconfiguration processing rule (253), a RAN start-up request is sent to the cognitive base station reconfiguration controller (233), and its response is returned.

In order to communicate with the network reconfiguration manager (100) with respect to top priority communication conditions, a RAN start request (GO) is sent to the cognitive base station reconfiguration controller (233) so as to bring the RAN in the operative state (GO). If connection of the RAN is established by the response, the cognitive base station reconfiguration manager (231) and the network reconfiguration manager (100) communicate with each other, and connection is made to the network reconfiguration manager (100) with a fixed host name using encrypted communication (SSH, HTTPS and the like) through the path (241).

In order for the network reconfiguration manager (100) to identify the cognitive base station reconfiguration manager (231), the cognitive base station reconfiguration manager (231) notifies the presence of a base station, identification number, and the like to the network reconfiguration manager (100).

To determine a network policy, the network reconfiguration manager (100) notifies the network policy to the cognitive base station reconfiguration manager (231).

If the network policy received by the cognitive base station reconfiguration manager (231) includes a host name of the network reconfiguration manager (100), which is an appropriate connection destination, and a change of the connection destination is needed, the network reconfiguration manager (100) as the connection destination is changed.

Figure 9:
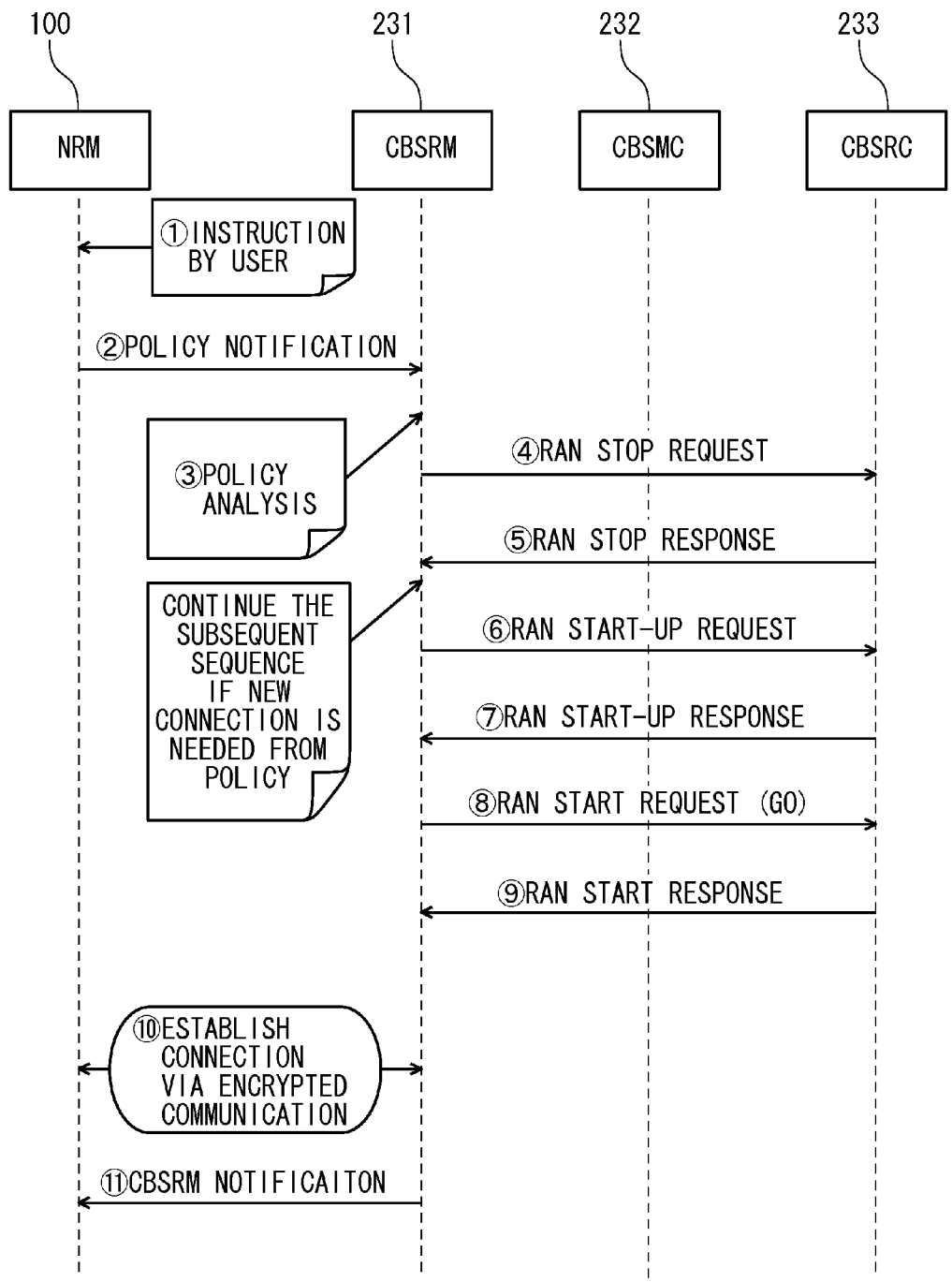
FIG. 9 is a sequence diagram between the base station reconfiguration manager and the network reconfiguration manager.
Figure 10:
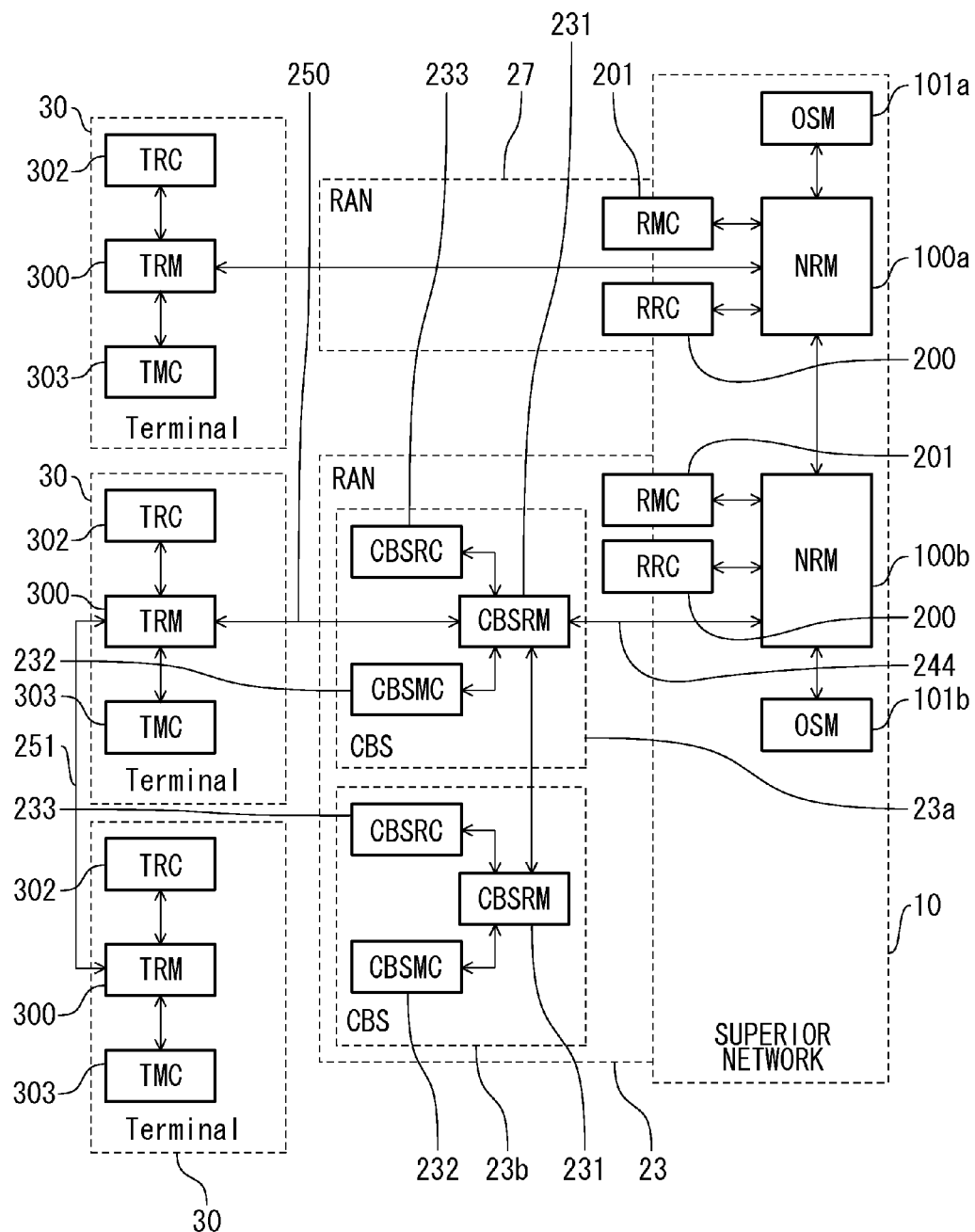
FIG. 10 is architecture in which the present invention is introduced to IEEE1900.4.

(e) If a Network Policy has been Changed:

As shown in FIG. 9, when the operator spectrum manager (101) selects abase station instructed by the user, a specified network policy is sent from the network reconfiguration manager (100) to the cognitive base station reconfiguration manager (231) of the base station. In the cognitive base station reconfiguration manager (231), the policy is analyzed, and a RAN stop request is transmitted from the cognitive base station reconfiguration manager (231) to the cognitive base station reconfiguration controller (233) in order to stop the RAN communication as necessary, and its response is returned.

Here, if a new connection is required by the policy, a sequence from the RAN start-up request is executed similarly at the time of start-up. Since it is similar to the above, the explanation will be omitted.

As mentioned above, in the present invention, the cognitive base station reconfiguration manager (231) also exchanges information with other base station reconfiguration managers (236), . . . , but a trigger of the information exchange is when the communication condition has been changed such as each of the above cases. The exchanged information can be the communication conditions set at each base station and also, the network policy can be exchanged so that the priority order can be shared, for example.

Subsequently, a processing sequence of the terminal reconfiguration manager (300) and the cognitive base station reconfiguration manager (231) as well as the network reconfiguration manager (100) within a range relating to the present invention will be described.

(f) Base-Station Evaluation Advertisement

A base-station evaluation advertisement is a sequence between the terminal reconfiguration manager (300) in the terminal and the cognitive base station reconfiguration manager (231) as well as the network reconfiguration manager (100) and advertises quality information of the base station measured by the communication terminal. The information obtained in radio communication with the base station in the terminal reconfiguration controller (302) or the terminal measurement collector (303) such as SSID, RSSI, a channel in use, a frequency, a band, a delay with the base station, a jitter, a loss rate of the base station, for example, is notified to the cognitive base station reconfiguration manager (231) and the network reconfiguration manager (100).

Detection of deterioration of the wireless communication quality, in addition to the predetermined cycle, may be a trigger of this notification. The cognitive base station reconfiguration manager (231) and the network reconfiguration manager (100), having received the notification, also notify it to the other cognitive base station reconfiguration managers and the network reconfiguration manager as mentioned above so that the communication state between a certain base station and a certain communication terminal can be shared.

It is known that the information on signal intensity can be obtained as the RSSI value in the wireless LAN, but in the present invention, since it is scheduled that a plurality of wireless systems are used in a mixed state, a data table for comparing the RSSI value and a dBm value is provided in the storage means in advance, and the measured RSSI value may be converted to a dB value. For example, a conversion chart also used in this embodiment has values as in Table 6.

TABLE 6

| RSSI [mV] | RF input Lv [dBm] |
|---|---|
| 205 | −25 |
| 304 | −30 |
| 404 | −35 |
| 493 | −40 |
| 603 | −45 |
| 698 | −50 |
| 795 | −55 |
| 910 | −60 |
| 1000 | −65 |
| 1104 | −70 |
| 1203 | −75 |
| 1292 | −80 |
| 1365 | −85 |

(g) Base Station Information Request

A base station information request is a sequence between the terminal reconfiguration manager (300) in the communication terminal and the cognitive base station reconfiguration manager (231) as well as the network reconfiguration manager (100)and in response to an inquiry by a terminal about information relating to a specific base station, a location of the cognitive base station reconfiguration manager or the network reconfiguration manager having the information is searched among the cognitive base station reconfiguration managers and the network reconfiguration managers present in plural on the network and requested information is obtained and replied to the terminal.

If, for example, the communication terminal is to obtain information of another base station (such as the base station SSID) for the cognitive base station reconfiguration manager (231) of the base station in connection, the cognitive base station reconfiguration manager (231) that has received the request notification first makes an inquiry at another cognitive base station reconfiguration manager capable of direct communication. If the cognitive base station reconfiguration manager that has the information of the target base station cannot be found, an inquiry is made at the network reconfiguration manager (100) or further at the cognitive base station reconfiguration manager connected to that. As a result of the inquiry, the information of the base station is collected from the cognitive base station reconfiguration manager or the network reconfiguration manager that has the information.

If a plurality of cognitive base station reconfiguration managers or the network reconfiguration managers have information of the target base station, they are different in general. Therefore, information requested by the terminal reconfiguration manager (300) is evaluated. The evaluation result is notified to the terminal reconfiguration manager (300) as a response.

Finally, a configuration to introduce the present invention to the existing architecture of IEEE1900.4 will be described. FIG. 6 is the architecture. Since the above-described components are referred to by the same reference numerals, the explanation will be omitted.

First, co-existence with the prior-art architecture is also possible when the present invention is to be put into practice. In the network reconfiguration manager (NRM) (100*a*), the cognitive base station reconfiguration manager (CBSRM) is not disposed in the base station of the RAN (27) but direct connection is made with the terminal reconfiguration manager (TRM) of the communication terminal (30).

On the other hand, the NRM (100*b*) is the configuration of the present invention and is connected to the CBSRM (231) of the base station (23) through the communication path (244). In the CBSRM (231), the TRM (300) and the communication terminal-base station communication path (250) are disposed so that the reconfiguration contents determined at the base station can be notified to the communication terminal. For example, the frequency in operation, the modulation method, the information on wave interference at the base station and the like can be notified to the communication terminal (30).

Also, in the present invention, it is proposed that the inter-communication terminal communication path (251) that connects the TRMs (300) of the communication terminals (30) to each other is disposed.

In this communication path (251), the usage state of the frequency can be exchanged between the communication terminals and the exchange of the wave interference state with each other can contribute to determination of the reconfiguration contents in the communication terminal reconfiguration manager (300).

The information exchanged among the NRM, the CBSRM, and the TRM can include the following:
- a ratio of traffic (%) currently handled to the traffic that can be handled at each base station;
- the number of connected terminals at each base station;
- a received wave intensity RSSI (dBm) value at a base station on the Internet side (if connected to the Internet through another radio base station);
- a traffic (byte) for an external network (the Internet, for example) from an internal network at each base station;
- a traffic (byte) for an internal network from an external network at each base station;
- an ID (a MAC address, for example), a central frequency (MHz) in operation, a band width (MHz), wave intensity (dBm), and a modulation method of the base station that can be recognized from the periphery;
- a list of frequency bands in which operation is allowed for the station and the respective priorities; and
- the minimum received electrical field intensity (dBm) and a bit error rate (%) to become a trigger of handover.

Reference Signs List
- 10 superior network
- 100 network reconfiguration manager (NRM)
- 23 radio access network
- 23*a* cognitive base station 1
- 23*b* cognitive base station 2
- 231 cognitive base station reconfiguration manager (CBSRM)
- 232 cognitive base station measurement collector (CBSMC)
- 233 cognitive base station reconfiguration controller (CBSRC)
- 234 communication path
- 235 communication path
- 236 cognitive base station reconfiguration manager (CBSRM)
- 237 cognitive base station measurement collector (CBSMC)
- 238 cognitive base station reconfiguration controller (CBSRC)
- 239 communication path
- 240 communication path
- 241 network-base station communication path
- 242 inter-base station communication path

The invention claimed is:

1. A cognitive communication network system in which communication terminals conduct communication while presence of connection with a plurality of wired or wireless communication networks or a connection method are dynamically reconfigured, wherein
   the communication network has a plurality of radio access networks and a superior communication network that provides a common platform to at least the radio access network;
   network reconfiguration manager disposed on the superior communication network that reconfigure at least one of either a selection of one of the plurality of radio access networks used for the communication or a communication condition in a selected one of the radio access networks on the basis of information relating to a communication state in the radio access network (RAN) collected by a RAN measurement collector; and
   in each of at least two or more base stations among a plurality of base stations on at least a part of at least one of the radio access networks,
   cognitive base-station measurement collector that collects information relating to a state of at least one of
   a particular one of the base stations, the state being associated with the particular one of the base stations, or
   the communication state;
   and
   cognitive base-station reconfiguration manager that reconfigures, within the radio access network, at least one of either
   the selection of one of the plurality of base stations used for the communication or
   the communication condition in a selected one of the base stations on the basis of the information collected by the cognitive base-station measurement collector so that the autonomous reconfiguration by the radio access network occurs.

2. The cognitive communication network system according to claim 1, wherein
   in said base station, a cognitive base station reconfiguration controller that sets the connection with a plurality of wired or wireless communication networks or connection method in the base station are disposed on the basis of a decision of said network reconfiguration manager and said cognitive base-station reconfiguration manager.

3. The cognitive communication network system according to claim 1, wherein in said radio access network, an inter-base station communicating path capable of exchanging a state at each base station or a reconfiguration result of base-station communication by connecting said cognitive base-station reconfiguration manager of each base station is disposed.

4. The cognitive communication network system according to claim 1, further comprising
a network-base station communicating path that exchange at least one of either the information relating to the superior communication network or the information relating to the state of the base station by connecting said network reconfiguration manager and said cognitive base-station reconfiguration manager to each other.

5. The cognitive communication network system according to claim 4, wherein
said base stations exchange the state in each base station or the reconfiguration result of the base-station communication with each other through the network reconfiguration manager using said network-base station communicating path.

6. The cognitive communication network system according to claim 1, wherein
in at least one of said communication terminals, a terminal measurement collector that collects information relating to a state of the communication terminal itself or the communication state and a terminal reconfiguration manager that reconfigures communication conditions in the communication terminal on the basis of the information collected by the terminal measurement collector.

7. The cognitive communication network system according to claim 6, further comprising:
a communication terminal-base station communicating path that exchanges at least either one of information relating to the state of the base station or the information relating to the state of the communication terminal by connecting said terminal reconfiguration manager and said cognitive base-station reconfiguration manager to each other.

8. The cognitive communication network system according to claim 6, further comprising
an inter-communication-terminal communicating path capable of exchanging information relating to the state of the communication terminal with each other by connecting said terminal reconfiguration manager of said communication terminals to each other.

9. A base station in a radio access network in the cognitive communication network system according to claim 1, comprising:
the cognitive base-station measurement collector that collects information relating to the state of the base station itself in the base station or the communication state; and
the cognitive base-station reconfiguration manager that reconfigure at least one of either selection of the base station to be used for communication or the communication condition in the base station on the basis of the information collected by the cognitive base-station measurement collector.

10. A communicating method in a cognitive communication network system in which communication terminals conduct communication while presence of connection with a plurality of wired or wireless communication networks or a connection method are dynamically reconfigured,
in a configuration in which the communication network has a plurality of radio access networks and a superior communication network that provides a common platform at least to the radio access networks, wherein a RAN communication state obtaining process in which a RAN measurement collector collects information relating to a communication state in the radio access network (RAN); and
a network reconfiguration managing process in which a network reconfiguration manager on the superior communication network reconfigures at least one of either a selection of one of the plurality of radio access networks to be used for the communication or the communication condition in a selected one of the radio access networks on the basis of the information collected by the RAN measurement collector are executed at a predetermined trigger; and
in each of at least two or more base stations among a plurality of base stations on at least a part of at least one of the radio access networks,
a base-station state obtaining process in which a cognitive base-station measurement collector collects information relating to
a state of a particular one of the base stations, the state being associated with the particular one of the base stations, or
the communication state; and
a base-station communication reconfiguration managing process in which a cognitive base-station reconfiguration manager reconfigures, within the radio access network, at least either one of
selection of one of the plurality of base stations to be used for the communication or
the communication condition in a selected one of the base stations, wherein reconfiguring is executed on the basis of the information collected by the cognitive base-station measurement collector at a predetermined trigger so that the autonomous reconfiguration by the radio access network occurs.

11. The communicating method in the cognitive communication network system according to claim 10, wherein
in said radio access network,
an inter-base station communication process in which an inter-base station communicating path exchanges the state in the base station or the reconfiguration result of the base-station communication with each other by connecting the cognitive base-station reconfiguration manager of each base station is provided.

12. The communicating method in the cognitive communication network system according to claim 10, wherein
in said superior communication network,
a network-base station communication process in which a network-base station communicating path exchange at least either one of the information relating to the superior communication network or the information relating to the state of the base station by connecting said network reconfiguration manager and said cognitive base-station reconfiguration manager is provided.

13. The communicating method in the cognitive communication network system according to claim 12, wherein
said base stations exchange the state in each base station or the reconfiguration result of the base-station communication through the network reconfiguration manager using said network-base station communicating path.

14. The communicating method in the cognitive communication network system according to claim 10, wherein
in at least one of said communication terminals,
a communication-terminal state obtaining process in which a terminal measurement collector collects information of a state of the communication terminal itself or information relating to the communication state; and a communication-terminal reconfiguration managing process in which a terminal reconfiguration manager reconfigures the communication condition in the communication terminal on the basis of the information collected by the terminal measurement collector is provided.

15. The communicating method in the cognitive communication network system according to claim 14, wherein
in said radio access network,
a communication terminal-base station communicating path exchanges at least either one of the information relating to the state of the base station or the information relating to the state of the communication terminal by connecting said terminal reconfiguration manager and at least said base-station communication reconfiguration manager.

16. The communicating method in the cognitive communication network system according to claim 14, wherein
in said communicating method,
an inter-communication terminal communicating path exchanges information relating to the state of the communication terminal by connecting said terminal reconfiguration manager of each said communication terminal to each other.

\* \* \* \* \*